Dec. 26, 1922.
N. M. MILLER.
BLENDING, GRADING, AND BAGGING BIN.
FILED MAR. 1, 1920.
1,440,165
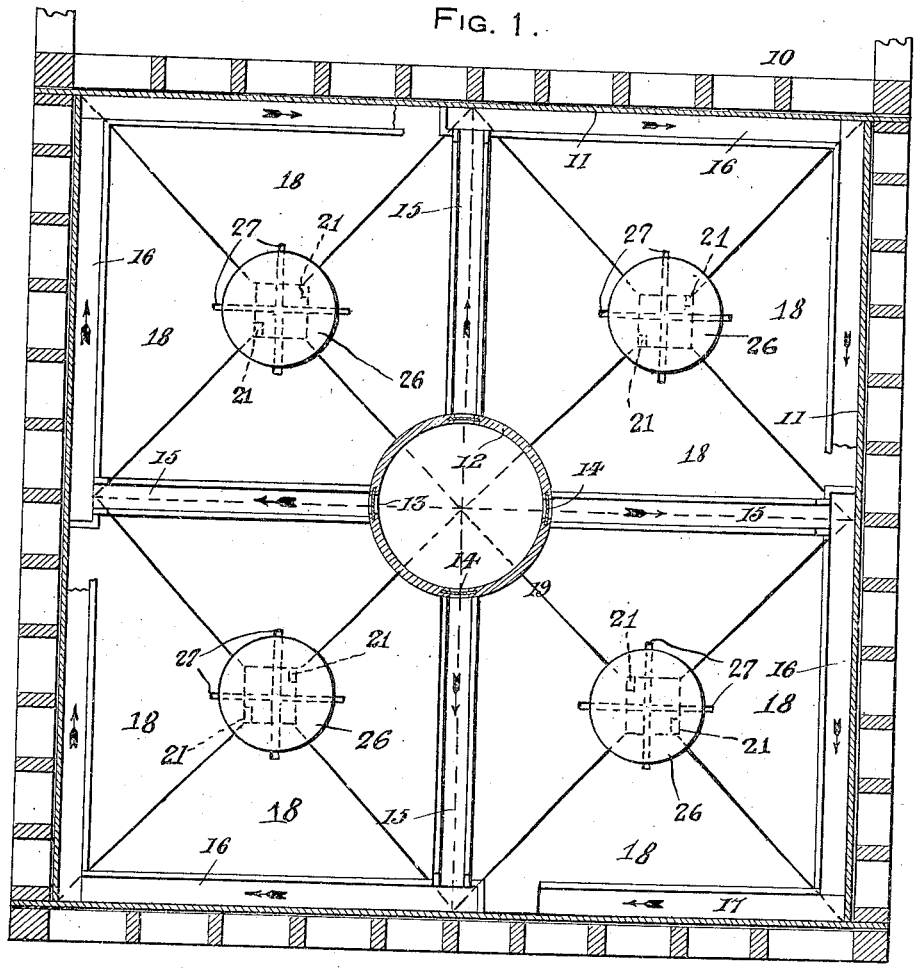
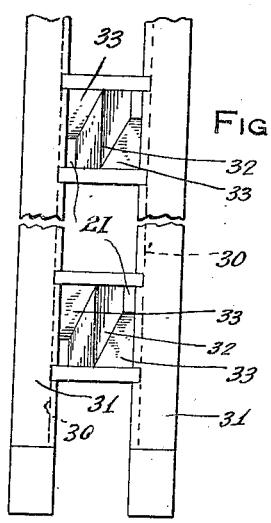
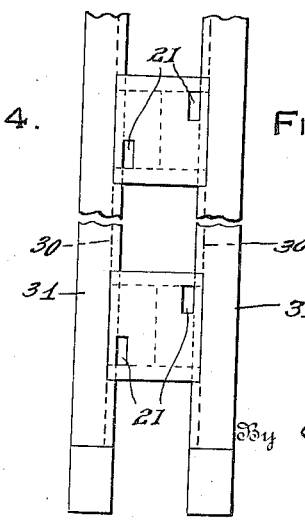

Dec. 26, 1922.

N. M. MILLER.
BLENDING, GRADING, AND BAGGING BIN.
FILED MAR. 1, 1920.

1,440,165

2 SHEETS-SHEET 2

Inventor
N. M. Miller
By
Attorney

Patented Dec. 26, 1922.

1,440,165

UNITED STATES PATENT OFFICE.

NICHOLAS M. MILLER, OF AURORA, ILLINOIS.

BLENDING, GRADING, AND BAGGING BIN.

Application filed March 1, 1920. Serial No. 362,374.

*To all whom it may concern:*

Be it known that I, NICHOLAS M. MILLER, a citizen of the United States of America, residing at Aurora, in the county of Kane and State of Illinois, have invented certain new and useful Improvements in Blending, Grading, and Bagging Bins, of which the following is a specification.

The primary object of the present invention is the provision of a bin in which grain such as grass seeds may be withdrawn in a uniform grade, a system of complete mixing being provided for blending the seeds and the constant turning of the seed while bagging is unnecessary as ordinarily employed for grading in blue-grass seed mills.

A further object of the invention is the provision of a seed bin in which the grain is conveyed downwardly without violently dropping the same, thereby preventing separation of the smaller and heavier seeds from the light, large, and chaffy seeds so that an even blending and grading is provided throughout the entire bulk.

A still further object of the invention is to provide a bin for evenly distributing the grain to suitably-regulated outflow spouts, the construction being easy and inexpensive to manufacture and well calculated to carry out the advantages herein set forth.

With these general objects in view and others that will appear as the nature of the invention is better understood, the same consists in the novel construction, combination, and arrangement of parts hereinafter more fully described, illustrated in the accompanying drawings, and then claimed.

Figure 2:
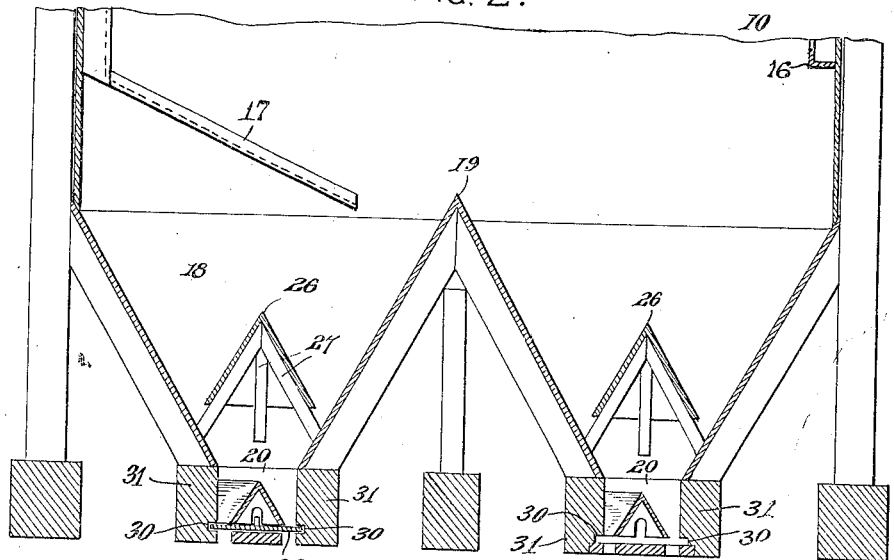
Figure 3:
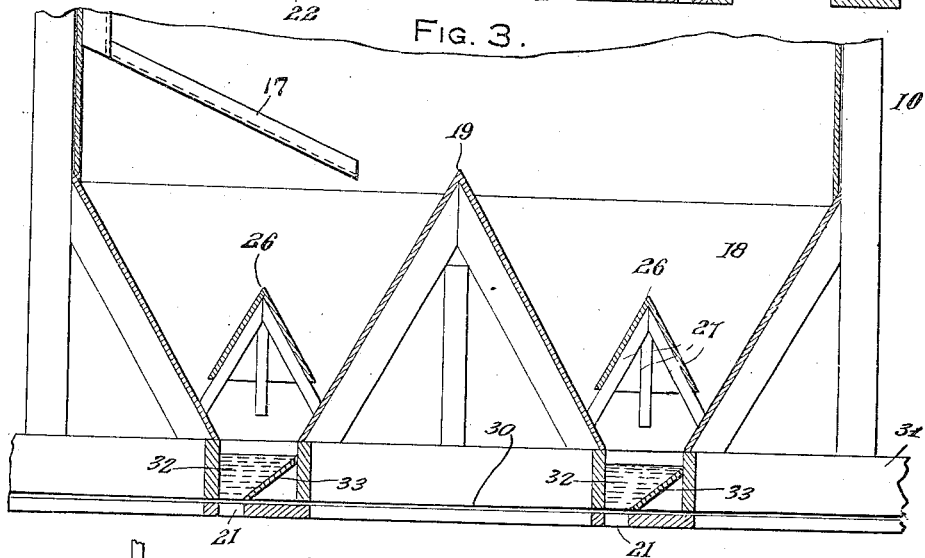
Figure 6:
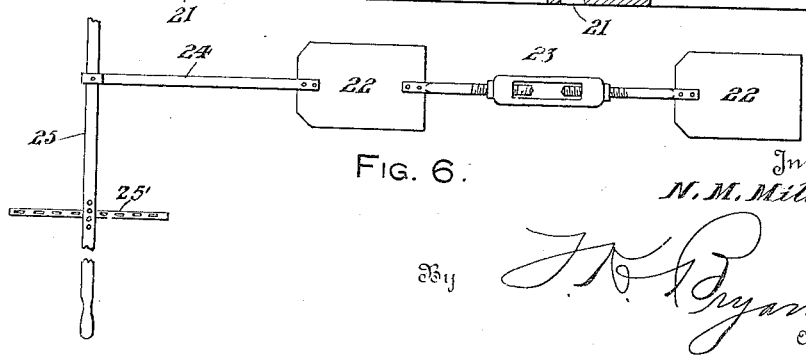

In the drawings forming a part of this application, and in which like designating characters refer to corresponding parts throughout the several views, Figure 1 is a horizontal sectional view through a bin formed after my invention, Figure 2 is a vertical transverse sectional view thereof, Figure 3 is a vertical transverse sectional view taken upon a different line of section from that shown in Fig. 2, Figure 4 is a top plan view of two of the flow-holes for the grain, Figure 5 is a bottom plan view of the same, and Figure 6 is a detail view of the bin gate or slide controlling the flow-holes.

Referring more in detail to the drawings, it will be understood that a rectangular bin 10 is built up of any desired dimensions having four vertical walls 11, with a central receiving hopper 12 secured at a suitable elevation therein. Peripherally positioned outlets 13 in the hopper 12 are controlled by vertically adjustable slides 14, the grain or seed flowing by gravity through the outlets 13 to the downwardly inclined troughs 15, leading in diametrically opposite directions towards the opposite side walls 11 of the bin substantially centrally thereof.

The troughs 15 communicate with the upper ends of inclined troughs 16 carried by the side walls 11 which have downwardly emptying portions 17 secured to the next adjacent wall of the bin and whereby the grain is deposited within the inverted frustoperimetral main bottom pockets 18 of the bin. There are four of these main bottom pockets 18, a centrally disposed ridge 19 from which extend flaring walls 19' serving to divide the bin into such pockets.

At the bottom of each of the main pockets 18 is an outlet pocket 20 of rectangular form and having at opposite corners outlet openings 21 also of rectangular form. The pocket 20 has its outlet openings 21 controlled by gates 22 sliding in grooves 30 formed in cross beams 31. These gates 22 are preferably connected in pairs as shown in Figure 6, a turnbuckle 23 being employed in the connection between the two gates of each pair so that the distance between said gates 22 may be adjusted. Also one gate of each pair has connected thereto a link 24 which is pivoted to a lever 25 working over a rack 25' whereby the degree of opening of the gates may be adjusted and held. Over each of the pockets 20 is mounted a distributor cord 26 supported on a strider 27.

The bottom of each pocket 20 is peculiarly formed. Extending longitudinally of the pocket is an inverted V-shaped baffle 32, a ridge of the baffle being centrally disposed of the pocket while the sides slope downward to the outlets 21. Also from each end wall of each pocket 20 an inclined baffle 33 slopes downward to a respective outlet 21.

Under this construction it will be seen that grain from the hopper will pass through the openings 13 and down the inclined chutes 16 to the terminal portion 17 there dropping into the respective pockets 18. By this means the grain is fed gently downward and not dropped violently so that there is no separation of the heavier and lighter parts of the grain or seed. Moreover the baffles 26 effect an even distribution of the grain when held in the pockets 18 as soon as the gates 22 are opened so that the outward flow, on account of the path traveled, causes further mixing. When the grain flows into the delivery pockets 20 the baffle 32 divides it into two portions, one portion flowing outward through one opening 21 while the other portion flows outward through the other opening 21. It is obvious that grain from either of the openings 21 may be sacked or bagged while the remaining grain may be returned to the hopper 12 for further mixing with what remains in said hopper. Thus half of the grain is drawn off finally and half may be returned. This return may obviously be effected either manually or by a conveyor mechanism.

What I claim as new and desire to secure by Letters Patent is:—

1. A device of the class described comprising a rectangular bin, a hopper centrally mounted therein having a plurality of outlets, and discharge troughs for said outlets leading outwardly from said hopper to the sides of the bin and thence downwardly and around said sides and discharging adjacent the bottom of the bin, said bin having outlet openings in its bottom.

2. A device of the class described comprising a rectangular bin, a hopper centrally mounted therein having a plurality of outlets, discharge troughs for said outlets leading outwardly from said hopper to the sides of the bin and thence downwardly and around said sides and discharging adjacent the bottom of the bin, the said bin having a contracted bottom provided with a plurality of outlet pockets and openings, sliding gates adapted for controlling the outlet of grain from the bin through said pockets, a pointed baffle for the grain centrally of the bottom of the bin and conical baffles above the said pockets whereby the flow of grain to the pockets is rendered uniform.

3. A blending, grading, and bagging bin having side walls, a tapered bottom, a central pointed baffle carried by said bottom, outlet members for the grain at the side of the baffle and conical flow-controlling baffles above said outlet members and means for selectively controlling the outlet members.

In testimony whereof I affix my signature.

NICHOLAS M. MILLER.